Nov. 14, 1933.  P. R. FRANCIS  1,934,684
HOIST BRAKE
Filed Nov. 28, 1930

INVENTOR.
PAUL R. FRANCIS.
BY
*H. A. Duckman*
ATTORNEY.

Patented Nov. 14, 1933

1,934,684

UNITED STATES PATENT OFFICE 1,934,684

HOIST BRAKE

Paul R. Francis, Los Angeles, Calif.

Application November 28, 1930
Serial No. 498,637

1 Claim. (Cl. 188—74)

This invention relates to a brake for hand operated hoists, and the prime object of my invention is to provide a novel brake which is simple in construction, which is easily operated, and which can be adjusted by the manipulation of a single nut.

Other objects, advantages, and features of invention may appear from the accompanying drawing, the subjoined detailed description, and the appended claim.

Figure 2:
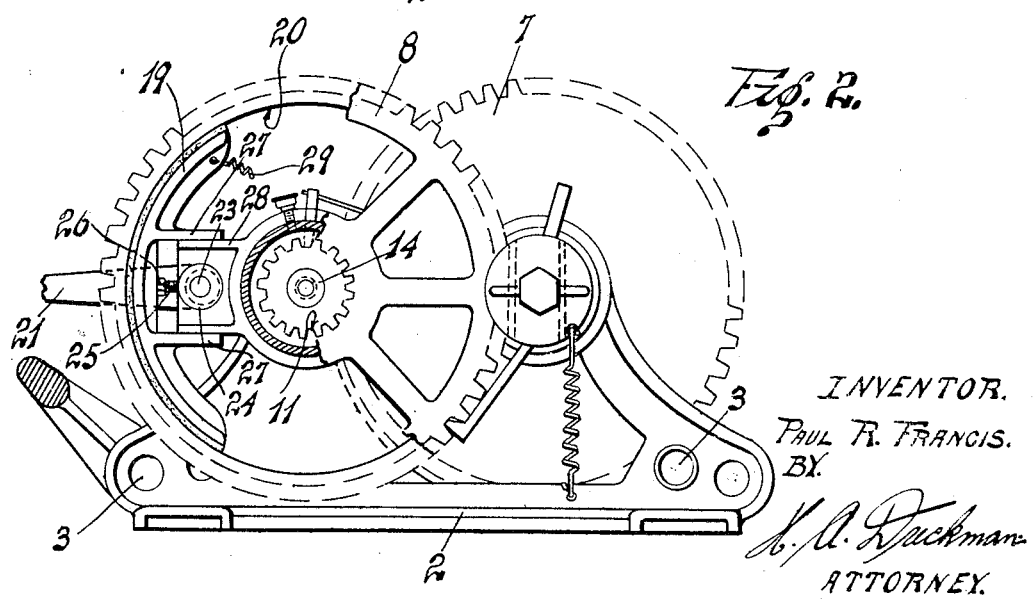
Figure 2 is an end view of the same with parts broken away to show interior construction.

Referring more particularly to the drawing, my hand hoist comprises two parallel frame members 1—2. These frame members are rigidly spaced and secured together by means of a plurality of truss-rods 3. These rods are preferably adjacent the bottom of the frame members, as shown in Figure 2. A drum shaft 4 extends between the frame members 1—2 and is mounted therein. The bearings for the drum shaft are preferably of the anti-friction type, as shown at 5—5. The drum shaft 4 is adjacent the top of the frames 1—2 and acts as a brace for the top of the frame.

The shaft 4 is stationary and the drum 6 rotates thereon, the drum rotating upon the anti-friction bearings 5—5. The drum 6 is provided with a gear 7 on one end thereof, said gear being provided with external teeth. A second gear 8 is journaled on the frame 2, and preferably on a sleeve bearing 9. The gear 8 is provided with an integral pinion gear 10 which meshes with the gear 7.

A splined or toothed socket 11 is formed in the gear 8, and a splined pin 12 fits in the splines 11. A handle 13 is secured to, or is integrally formed with the pin 12 and said pin is rotated by means of said handle. A stub shaft 14 is mounted in the gear 8 axially with the pinion 10, and the pin 12 fits on to the outer end of this shaft. The gear is secured to the shaft in meshing engagement, as shown in Figure 1, by means of a headed bolt 15 which screws into the end of the shaft 14.

Figure 1:
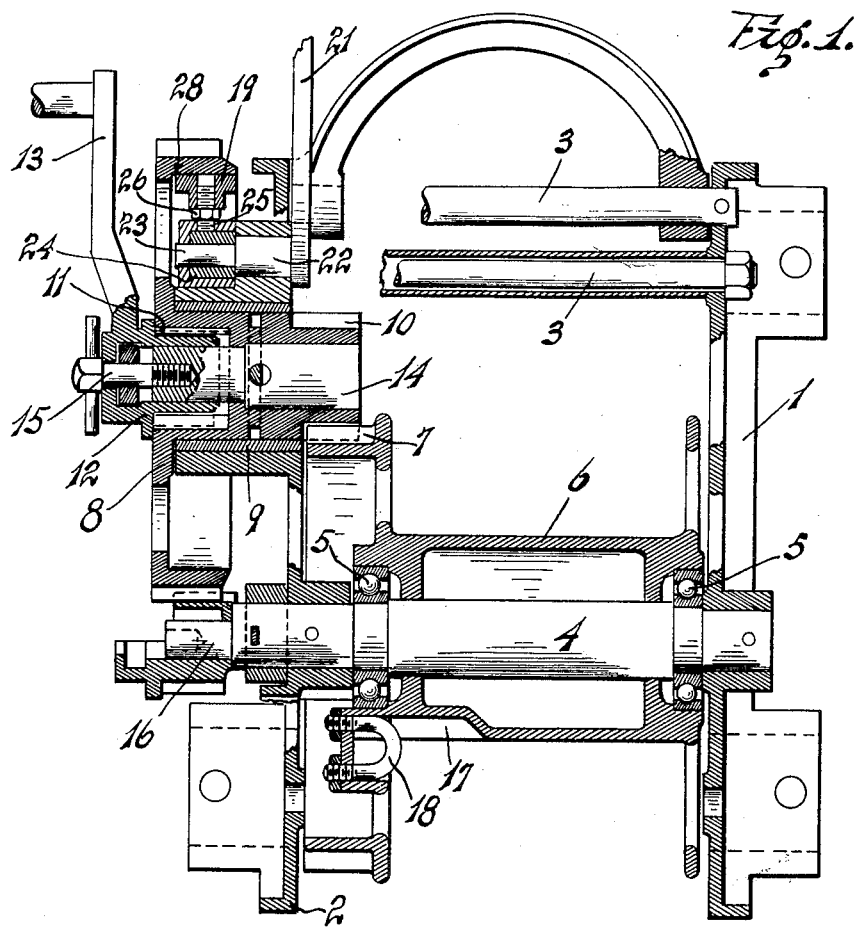
Figure 1 is a longitudinal, sectional view of a hoist with my brake mounted thereon.

When it is desired to change the gear ratio, the splined pin 12 is removed from the position shown in Figure 1, and is secured to the outer end of the drum shaft 4. The outer end of said shaft is reduced as at 16 so that the pin fits thereon. The teeth on the pin in this latter position engage the external teeth on the gear 8 thus causing said gear to rotate and in turn rotating the drum shaft 6 through the medium of the meshing gears 7—10.

The cable is secured to the drum 6 in the following manner: A groove or recess 17 is formed in the drum 6 adjacent one end thereof. A U-bolt 18 fits in the groove 17 and extends through the side wall of the drum 6. The cable is attached to the U-bolt 18 and the bolt is then secured to the drum, as shown in Figure 1. Due to the long recess or groove 17, there is no sharp kink or abrupt turn in the cable, therefore, the cable will wear longer and will lay more smoothly on the drum.

A hand brake is provided for the hoist, which brake consists of a single arcuate shoe 19 engaging the inner brake surface 20 of the gear 8. The shoe 19 is provided with the usual brake lining or facing, all of which is usual and well-known. A brake hand lever 21 is formed with a stub shaft 22 which is journaled in the frame 2. An eccentric 23 is integrally formed on the stub shaft 22. A ring 24 encircles the eccentric 23 and a threaded pin 25 rises from said ring. The pin 25 extends into the center of the shoe 19, and an adjusting nut 26 screws on to the pin against the shoe, thereby enabling said shoe to be adjusted relative to the brake surface 20 of the gear.

It will be evident that when the lever 21 is moved downwardly, the eccentric 23 will carry the ring 24 outwardly towards the gear 8 and will thus move the brake shoe 19 against the brake surface 20. The shoe is guided in its movement by means of a pair of wings 27—27 which bear upon and are guided by tracks 28—28 which are integrally formed with the frame 2 of the hoist. The brake shoe 19 is pulled away from the gear 8 by means of springs 29 which are secured thereto.

Having described my invention, I claim:

A brake mechanism comprising a combination of a machine frame, a driving gear mounted on the frame, said gear having an internal brake surface, an arcuate brake shoe, a brake lever, a stub shaft journaled in the frame to which said lever is secured, an eccentric projecting from the stub shaft, a ring journaled on the eccentric, a threaded pin extending from the ring into the shoe and a nut screwed on to the pin against the shoe whereby the shoe is adjusted relative to the brake surface, guide wings formed on the shoe, a track formed on the frame, said guide wings bearing on the track to guide the shoe in its movement.

PAUL R. FRANCIS.